Dec. 4, 1956       E. K. HANSEN       2,772,914
DETACHABLE END GATE APPARATUS
Filed May 27, 1955       2 Sheets-Sheet 1
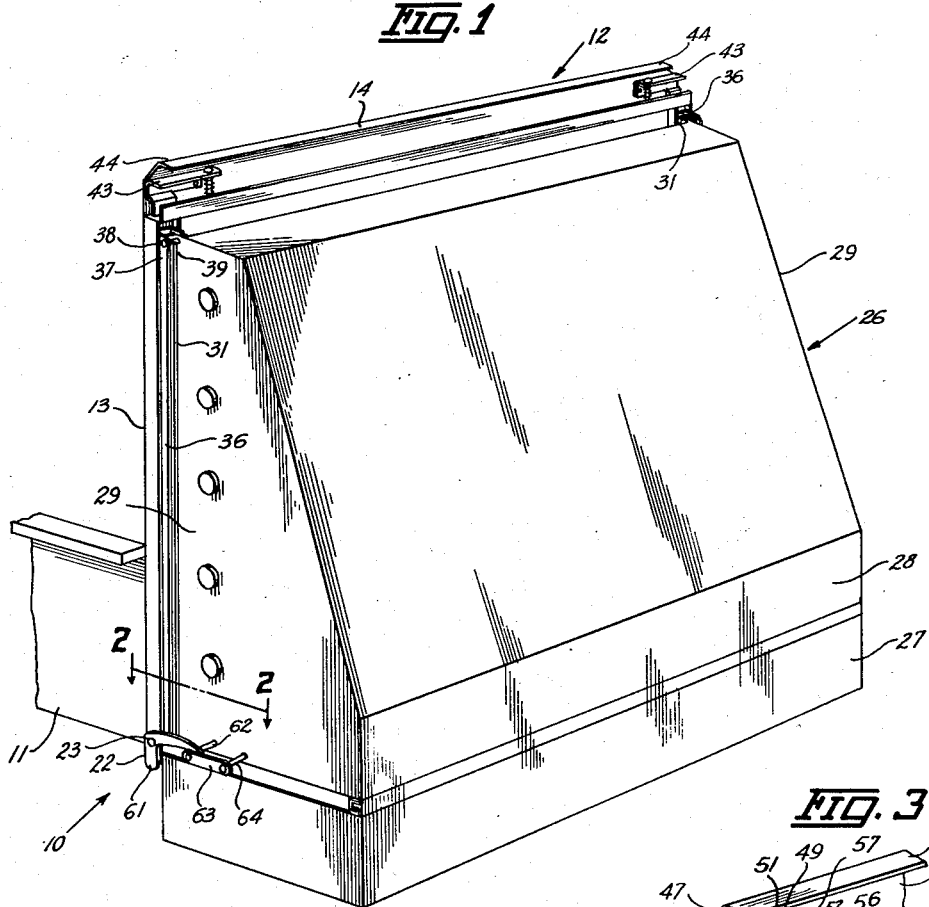
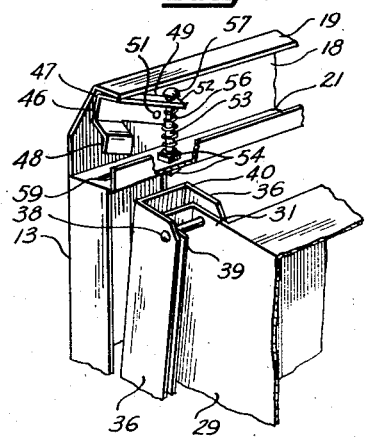
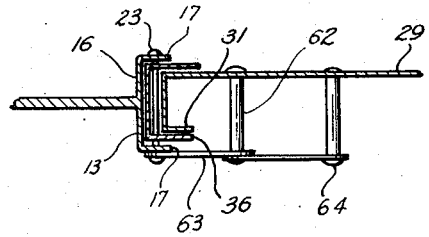
INVENTOR.
ELMER K. HANSEN
BY
*Rudolph L. Lowell*
ATTORNEY.

Dec. 4, 1956  E. K. HANSEN  2,772,914
DETACHABLE END GATE APPARATUS
Filed May 27, 1955  2 Sheets-Sheet 2
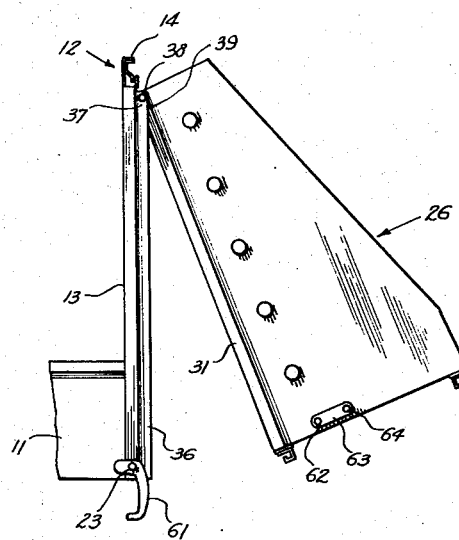
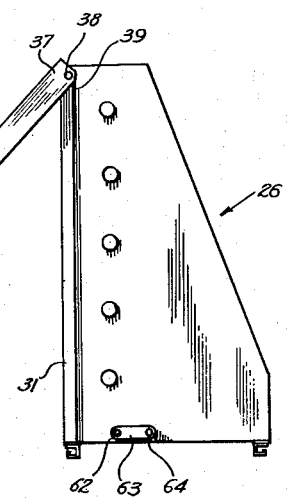
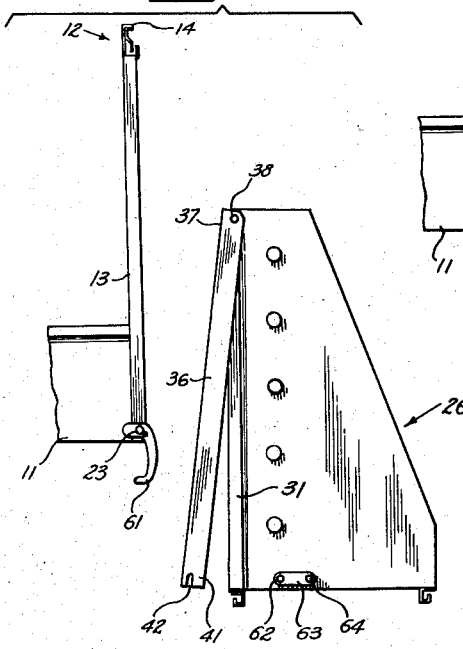
INVENTOR.
ELMER K. HANSEN
BY
ATTORNEY.

2,772,914
Patented Dec. 4, 1956

United States Patent Office 2,772,914

DETACHABLE END GATE APPARATUS

Elmer K. Hansen, Sioux City, Iowa

Application May 27, 1955, Serial No. 511,631

1 Claim. (Cl. 296—53)

This invention relates generally to end gates for wagons and the like and more particularly to a detachable end gate apparatus for wagons.

An object of this invention, therefore, is to provide an improved detachable end gate apparatus for wagons and the like.

A further object of this invention is to provide a detachable end gate apparatus for wagons which is interchangeable with the various end gate structures usually assembled with wagons of farm type.

Another object of this invention is to provide a detachable end gate apparatus for a wagon which facilitates the assembly of end gate structures with the wagon.

A further object of this invention is to provide a detachable end gate apparatus for a wagon which is simple in construction, economical to manufacture and efficient in operation to provide for a quick assembly of an end gate structure with a wagon.

Further objects, features and advantages of this invention will become apparent from a consideration of the following description when taken in connection with the accompanying drawing in which:

Fig. 1 is a fragmentary perspective view of a wagon showing the detachable end gate apparatus of this invention in assembly relation therewith;

Fig. 2 is a fragmentary sectional view looking substantially along the line 2—2 in Fig. 1;

Fig. 3 is a fragmentary perspective view of a portion of the end gate apparatus of this invention, showing parts in relatively moved positions;

Fig. 4 is a fragmentary side elevational view of a wagon and the end gate apparatus of this invention showing the end gate structure in an initial position for detachment from the wagon;

Fig. 5 is a fragmentary side elevational view of a wagon and the end gate apparatus of this invention, illustrated similarly to Fig. 4, showing the end gate structure in a partially detached position; and Fig. 6 is a side elevational view illustrated similarly to Figs. 4 and 5, showing the end gate structure in a fully detached position.

With reference to the drawing, the detachable end gate apparatus of this invention, indicated generally at 10, is shown in Fig. 1 in assembly relation with a farm wagon 11, only one end portion of which is shown. For convenience of description, such illustrated end portion will hereinafter be referred to as the rear end of the wagon 11.

The end gate apparatus 10 includes an upright inverted U-shape frame 12 (Fig. 1) rigidly mounted on the rear end of the wagon 11, with only one leg section or side member 13 and the base or top frame member 14, being shown. The frame 12 includes a pair of vertically extended legs or side channel frame members 13, which are connected together at their upper ends by the base or horizontal channel frame member 14. Each side frame member 13 is of a U-shape in transverse section (Fig. 2) having a base portion 16 and spaced parallel leg portions 17 extended in a direction rearwardly of the wagon 11. Likewise, the horizontal frame member 14 is of a substantially U-shape in transverse section (Fig. 3) having a base portion 18, an upper leg portion 19, and a lower leg portion 21, with the leg sections 19 and 21 being substantially horizontal and extended in a direction rearwardly of the wagon 11. Arranged adjacent the lower end 22 of each of the side frame members 13 and extended between the leg portions 17 thereof, is a transversely extended pin or bolt 23 (Fig. 2) for a purpose to appear later.

Movably supported on the frame 12 is an upright end gate structure, indicated generally at 26, which incorporates mechanism (not shown) operable to move material from the wagon 11 to a conveyor 27 removably mounted on the lower end 28 of the structure 26. A detailed description of such mechanism and operation of the end gate structure 26 is contained in my co-pending application Serial No. 511,484 filed May 27, 1955.

As best appears in Figs. 1, 2, and 3, the transversely opposite ends 29 of the gate structure 26 are formed at their forward ends with extensions 31, of a channel shape in transverse section, and corresponding to the upright frame members 13. The extensions 31 are arranged outwardly of the transverse confines of the end gate structure 26 (Figs. 1 and 6) and are of a reduced size relative to the frame members 13 (Fig. 2) to provide for a nested relation of an extension 31 within a corresponding side frame member 13.

A pair of elongated link members 36, of a channel shape in transverse section and corresponding to the channel shape extensions 31 are pivotally connected at their upper ends 37 by transverse pins 38 to the upper ends 39 of the extensions 31. As best appears in Fig. 2, a link 36 is of a size, in transverse section, intermediate the sizes of the frame members 13 and the extensions 31 to provide for a double nesting of the channel shape members 13, 36, and 31. The lower end 41 of a link 36 is formed with a transverse slot 42 (Fig. 6) of a size to be received on a pin 23 carried at the lower end of a corresponding frame member 13 for a purpose as will presently appear.

In the supported position of the end gate apparatus 10 on the wagon 11 (Figs. 1 and 2), the extensions 31, links 36 and frame members 13 are all arranged in a collapsed or nested relation, with the link 36 intermediate the frame member 13 and the extension 31.

For releasably maintaining the members 13, 36 and 31 in this nested relation, a pair of latch assemblies 43 (Fig. 1) are arranged at opposite ends 44 of the frame member 14. Since the assemblies 43 are identical, only one will be described in detail, with like numerals indicating like parts on both assemblies 43.

Each latch assembly 43 consists of an irregularly shaped latch member 46 (Fig. 3) having a horizontal handle portion 47 at the upper end and a downwardly extended stop or catch portion 48 at the lower end thereof. A lever member 49, pivoted intermediate its ends at 51 to the base portion 18 of the frame member 14 is formed integral at one of its ends with the latch member 46 and at its opposite end is formed with a horizontal plate portion 52. A bolt 53 extends downwardly through the plate portion 52 and is secured, as by a pair of nuts 54, to the lower leg portion 21 of the frame member 14. Positioned about the bolt 53, and arranged in compression between the leg portion 21 and the plate portion 52, is a spring 56 which biases the plate portion 52 upwardly into engagement with the bolt head 57. By virtue of the pivotal support of the lever 49, the spring 56 acts to bias the latch member 46 in a downward direction toward an elongated slot 59 formed in the leg portion 21 of the frame member 14. The slot 59 is of a size to receive the stop portion 48 of the latch member 46, which is of a length to extend downwardly through the slot 59 to a position between the leg portions 40 of a link 36.

It is seen, therefore, that in the supported or carrying position of the end gate structure 26, shown in Fig. 1, the latch assemblies 43 hold the structure 26 and the links 36 against any downward and rearward movement relative to the wagon 11, by virtue of the engagement of the stop portions 48 of the latch members 46 with the upper ends 37 of the links 36.

For maintaining the lower end 28 of the structure 26 against the lower ends 41 of the links 36, pivoted hooks 61 are provided on the pins 23 at the lower ends of the upright frame members 13. A hook 61, arranged on the outer side of a frame member 13, engages a rod 62 extended outwardly from the corresponding end 29 of the end gate structure 26 to maintain the structure 26 in an upright position against a link 36. A strap 63 connected between the outer end of the rod 62 and a rearwardly spaced rod 64 maintains the hook 61 against sliding movement off the rod 62.

In the use of the apparatus 10, assume the end gate structure 26 is in the upright supported position shown in Fig. 1 and that it is desired to remove it from the wagon 11, either for use of the wagon 11 without an end gate or for use with a different type end gate structure, such as a manure spreader or the like. The hooks 61 are disengaged from the rods 62 and the structure 26 is swung outwardly about the upper pivots 38 as shown in Fig. 4.

By grasping the handle portions 47 of the latch members 46, the stop portions 48 are readily moved upwardly against the action of the springs 56 to positions out of engagement with the upper ends 37 of the links 36. The end gate structure 26, along with the links 36, is then swung downwardly and rearwardly about the lower pivots 23, as illustrated in Fig. 5, until the structure 26 is in a ground supported position. The lower ends 41 of the links 36 are then moved to positions out of engagement with the pins 23 to completely disengage the end gate structure 26 and the links 36 from the wagon 11, as shown in Fig. 6. A winch and cable (not shown) or the like may be mounted on the frame 12 for coaction with the end gate structure 26 to facilitate lowering of the structure 26.

In re-assembling the end gate structure 26 on the wagon 11, the slots 42 at the lower ends 41 of the links 36 are received on the pins 23, and the end gate structure 26 and the links 36 are merely moved in a reverse direction to upright positions against the frame members 13. The latch assemblies 43 are manipulated to engage the stop portions 48 of the latch members 46 with the upper ends 37 of the links 36, after which the hooks 61 are engaged with their corresponding rods 62.

From the above description, it is seen that this invention provides an end gate apparatus 10 which is readily mounted on and removed from a wagon 11. As a result, a series of end gate structures, like the structure 26, may be provided with channel shaped extensions and links, corresponding to the extensions 31 and the links 36, respectively, to provide a series of interchangeable end gate structures.

Although the invention has been described with respect to a preferred embodiment thereof, it is to be understood that it is not to be so limited, since changes can be made therein which are within the full intended scope of this invention as defined by the appended claims.

I claim:

End gate apparatus for a wagon having an upright frame at one end thereof, said apparatus including an end gate structure movable to a first position supported in a back-to-back relation with said frame and to a second position supported on the ground, means for movably supporting said end gate structure for movement between said two positions therefor comprising a pair of link members, means pivotally connecting the upper ends of said link members to transversely spaced upper portions of said gate structure, other means for pivotally connecting the lower ends of said link members to transversely spaced lower portions of said upright frame, with one of said connecting means being releasable to provide for the removal of said end gate structure from said frame, when said end gate structure is in said second position therefor, and means for releasably holding said end gate structure in said first moved position therefor.

References Cited in the file of this patent

UNITED STATES PATENTS

| Re. 8,720 | Comstock | May 20, 1879 |
| 457,274 | Hall | Aug. 4, 1891 |
| 685,703 | Wilde et al. | Oct. 29, 1901 |

OTHER REFERENCES

Eng. News Record, May 29, 1919, vol. 82, #22, pp. 1081–2.